United States Patent
Gustafson et al.

(10) Patent No.: US 9,903,534 B2
(45) Date of Patent: Feb. 27, 2018

(54) CRYOGENIC LIQUID DELIVERY SYSTEM AND METHOD WITH ACTIVE PRESSURE BUILDING CAPABILITIES

(71) Applicant: CHART INC., Garfield Heights, OH (US)

(72) Inventors: Keith Gustafson, Waleska, GA (US); Erik Gustafson, Waleska, GA (US)

(73) Assignee: Chart Inc., Garfield Heights, OH (US)

( * ) Notice: Subject to any disclaimer, the term of this patent is extended or adjusted under 35 U.S.C. 154(b) by 713 days.

(21) Appl. No.: 14/044,622

(22) Filed: Oct. 2, 2013

(65) Prior Publication Data

US 2014/0096539 A1 Apr. 10, 2014

Related U.S. Application Data

(60) Provisional application No. 61/708,749, filed on Oct. 2, 2012.

(51) Int. Cl.
*F25B 39/02* (2006.01)
*F17C 7/04* (2006.01)
(Continued)

(52) U.S. Cl.
CPC ............. *F17C 7/04* (2013.01); *F02M 21/023* (2013.01); *F02M 21/0221* (2013.01);
(Continued)

(58) Field of Classification Search
CPC ... B60K 2015/03013; F17C 2270/0178; F17C 227/0107; F17C 7/02; F17C 7/04; F17C 7/042; F17C 2270/0107
(Continued)

(56) References Cited

U.S. PATENT DOCUMENTS

| | | | |
|---|---|---|---|
| 5,163,409 A | 11/1992 | Gustafson et al. | |
| 5,243,821 A * | 9/1993 | Schuck | F17C 7/04 417/53 |
| 5,259,198 A * | 11/1993 | Viegas | B60H 1/00007 62/239 |
| 5,421,160 A | 6/1995 | Gustafson et al. | |
| 5,421,161 A | 6/1995 | Gustafson | |
| 5,421,162 A * | 6/1995 | Gustafson | F17C 9/02 123/525 |
| 5,537,824 A | 7/1996 | Gustafson et al. | |
| 6,058,713 A * | 5/2000 | Bowen | B23K 9/173 62/46.1 |
| 6,505,469 B1 * | 1/2003 | Drube | F17C 7/04 62/48.1 |

(Continued)

FOREIGN PATENT DOCUMENTS

DE 102006031860 1/2007
EP 1 596 122 11/2005

OTHER PUBLICATIONS

International Preliminary Report on Patentability dated Apr. 5, 2015.
(Continued)

*Primary Examiner* — David Teitelbaum
(74) *Attorney, Agent, or Firm* — Cook Alex Ltd.; R. Blake Johnston

(57) ABSTRACT

A cryogenic fluid delivery system includes a tank adapted to contain a supply of cryogenic liquid, with the tank including a head space adapted to contain a vapor above the cryogenic liquid stored in the tank. A liquid withdrawal line is adapted to communicate with cryogenic liquid stored in the tank. A vaporizer has an inlet that is in communication with the liquid withdrawal line and an outlet that is in communication with a vapor delivery line. A pressure building circuit is in communication with the vapor delivery line and the head space of the tank. The pressure building circuit includes a flow inducing device and a control system for activating the flow inducing device when a pressure within the head space of the tank drops below a predetermined minimum pressure and/or when other conditions exist.

40 Claims, 3 Drawing Sheets

(51) Int. Cl.
*F17C 7/02* (2006.01)
*F02M 21/02* (2006.01)
*B60K 15/03* (2006.01)

(52) U.S. Cl.
CPC ........... *F02M 21/0287* (2013.01); *F17C 7/02* (2013.01); *B60K 2015/03013* (2013.01); *F02M 21/0215* (2013.01); *F17C 2201/056* (2013.01); *F17C 2201/058* (2013.01); *F17C 2205/0134* (2013.01); *F17C 2221/033* (2013.01); *F17C 2223/0153* (2013.01); *F17C 2223/0161* (2013.01); *F17C 2227/0107* (2013.01); *F17C 2227/0302* (2013.01); *F17C 2227/0393* (2013.01); *F17C 2265/066* (2013.01); *F17C 2270/0107* (2013.01); *F17C 2270/0178* (2013.01); *Y02T 10/32* (2013.01)

(58) Field of Classification Search
USPC ........................................................ 62/525
See application file for complete search history.

(56) References Cited

U.S. PATENT DOCUMENTS

2007/0298313 A1* 12/2007 Iida .................... B60L 1/003
                                                                    429/49
2011/0146605 A1*  6/2011 Dixon .................. F02B 43/10
                                                                    123/1 A

OTHER PUBLICATIONS

International Search Report and Written Opinion dated Dec. 12, 2013.

English Translation of DE 102006031860 published Nov. 25, 2007.

English Translation of EP 1596122 published Nov. 16, 2005.

\* cited by examiner

US 9,903,534 B2

CRYOGENIC LIQUID DELIVERY SYSTEM AND METHOD WITH ACTIVE PRESSURE BUILDING CAPABILITIES

CLAIM OF PRIORITY

This application claims priority to U.S. Provisional Patent Application No. 61/708,749, filed Oct. 2, 2012, the contents of which are hereby incorporated by reference.

FIELD OF THE INVENTION

The present invention relates generally to cryogenic delivery systems and methods and, in particular, to a cryogenic liquid delivery system and method with active pressure building capabilities.

BACKGROUND

This invention relates to a delivery system and method of a cryogenic fluid, such as liquefied natural gas (LNG), from a storage tank to a use device, such as a natural gas powered vehicle engine. An embodiment of the system of the invention is particularly suited for markets in which pre-saturation of the LNG fuel is not performed, though it may also function as a source of "trim heat" if the tank pressure falls below a pre-defined level.

Many heavy-duty vehicle engines require that the intake pressure of natural gas be around 100 psig. In most markets, LNG is saturated, or heat is added, to a point at which its vapor pressure is roughly equal to the pressure required by the use device. This process of building saturation pressure is typically performed at LNG fueling stations. However, there exist some markets in which this saturation of the fuel before transferring it to the vehicle storage tank is not performed or is not performed to an extent great enough to achieve 100 psig saturated liquid in the vehicle tank after fueling. Thus, the storage tank may end up being filled with LNG well below the desired pressure.

One proposed method for building tank pressure is to utilize a pressure building circuit that is common on many stationary cryogenic cylinders. These circuits function by utilizing gravity to feed liquid cryogen into a vaporizer. Upon vaporization of the liquid, its volume expands and the evolved gas is routed to the vapor space above the cryogen, building a head of vapor pressure above the liquid phase in the tank. However, there are three distinct problems with this type of circuit for LNG vehicle tanks. First, as most LNG vehicle tanks are mounted horizontally, there is small liquid head pressure compared to a vertical tank to force liquid into the vaporizer. Second, since LNG vehicle tanks are used in mobile applications, any vapor pressure that is built above the liquid phase will quickly collapse as soon as the vehicle is in motion and the liquid and vapor phases mix. It may take several hours or more to add enough heat in this fashion to fully saturate the bulk of LNG in the tank. Third, because pressure building coils are gravity feed systems, the feed line is directly connected to the liquid space. In a vehicle accident, this open liquid line can be damaged, creating a fire hazard due to the large volumes of gas generated from a liquid leak.

Another proposed solution is referenced in U.S. Pat. No. 5,163,409 to Gustafson et at whereby compressed natural gas (CNG) is used to add vapor pressure above LNG to deliver the fuel at an elevated pressure. However, this solution requires a second tank for CNG be mounted on the vehicle, which would add weight and occupy space on the vehicle chassis.

DETAILED DESCRIPTION OF EMBODIMENTS

While the invention is described below in terms of liquid natural gas (LNG) as the cryogenic liquid, it is to be understood that the invention is not so limited and may be used with other types of cryogenic liquids in other applications.

The LNG delivery system described below overcomes the aforementioned shortcomings of the prior art by including a compressor or pump situated on a parallel path downstream of the vaporizer to actively force natural gas vapor hack into the vehicle fuel tank, adding heat to the tank at a rate that far exceeds that which could be accomplished by passive systems. Compressor operation is controlled by a control system that monitors the system pressure, turning the compressor on when system pressure is low and of when the system pressure reaches a predefined point. Once the liquid is saturated, the LNG delivery system functions as the system described in commonly owned U.S. Pat. No. 5,421,161 to Gustafson, the contents of which are hereby incorporated by reference.

Figure 1:
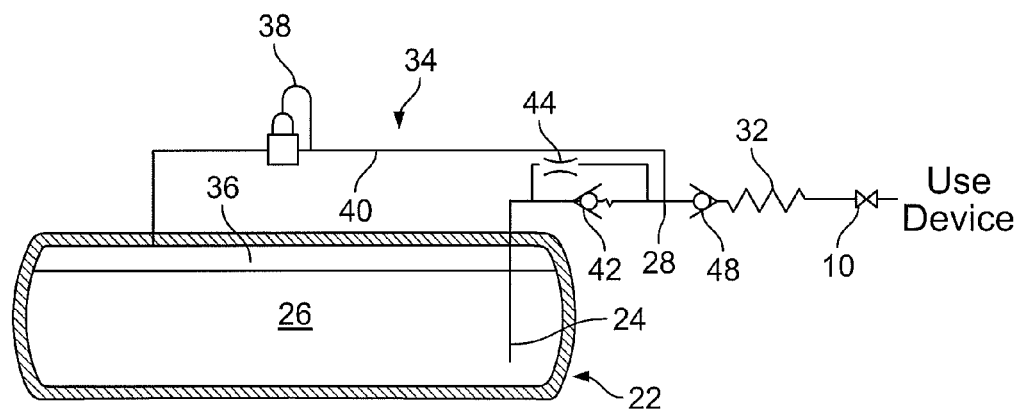
FIG. 1 is a schematic view of a prior art LNG delivery system.

FIG. 1 depicts the fuel delivery system in the '161 patent and a brief description is included here for clarity. A cryogenic tank 22 contains cryogenic product such as LNG consisting of liquid cryogen 26 with a vapor filling the tank vapor space or head space 36 above it. Liquid line 24 communicates with the bottom of tank 22 where liquid 26 is contained. Product withdrawal line 28 connects liquid line 24 to the gas use device such as a vehicle engine. A heat exchanger or vaporizer 32 is located in withdrawal line 28 to vaporize the cryogen before it is delivered to the use device. The withdrawal line also contains a tank mounted excess flow valve 48, which protects the downstream piping in case of a line break. Valve 10 in withdrawal line 28 may be taken to represent the throttle of a vehicle with the idea that demand for product is constantly changing. Economizer circuit 34 includes vapor tube 40, which communicates with head space 36, and includes economizer regulator 38, which is set at a predetermined pressure threshold. In this manner, when the pressure in tank 22 exceeds the set point of regulator 38, the vapor in head space 36 may be withdrawn through vapor line 40 and to the use device through withdrawal line 28, which lowers the pressure in tank 22. However, due to the horizontal nature of LNG vehicle fuel tanks, there is often sufficient hydrostatic pressure to cause liquid 26 to be withdrawn even when regulator 38 is open. Therefore, a biasing relief valve 42 is included in liquid line 24 to cause economizer circuit 34 to be the path of least resistance when regulator 38 is open. A small orifice 44 is located in parallel with relief valve 42 to allow back flow to the tank during transient periods of high to low use.

Figure 2:
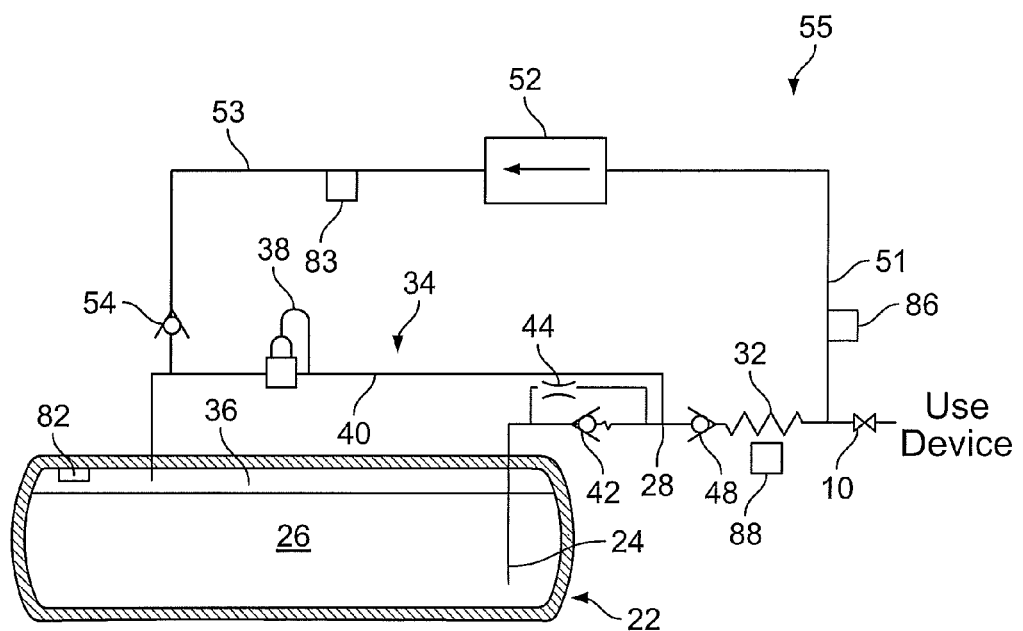
FIG. 2 is a schematic view of an embodiment of the delivery system of the invention.

Referring now to FIG. 2, a fuel system with the components previously described plus an additional active pressure building circuit 55 is shown. Inlet line 51 branches off withdrawal line 28 downstream of vaporizer 32. Flow inducer 52 causes vaporized gas to flow from inlet line 51 to outlet line 53 which returns the gas to vapor line 40 through check valve 54.

Figure 3:
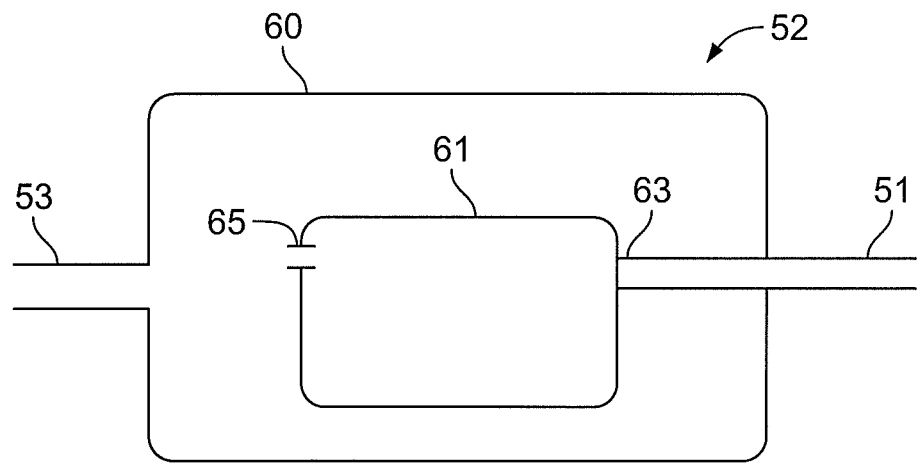
FIG. 3 is an enlarged schematic view of an embodiment of the flow inducing device of the delivery system of FIG. 2.

FIG. 3 shows one possible embodiment of the flow inducing device 52. Pressure vessel 60 operates at the same pressure as outlet line 53. Compressor 61 has inlet 63 piped directly to inlet line 51 and has outlet 65 open to the interior of vessel 60.

It should be noted that flow inducing device 52 is not limited to a compressor housed inside a pressure vessel, but may take on other forms of actively moving a fluid against a pressure gradient such as a positive displacement pump or other type of motor. Additionally, the process piping of the flow inducing device may be configured in other manners, such as by piping the compressor outlet to the tank and leaving the compressor inlet open to the interior of the vessel.

Figure 4:
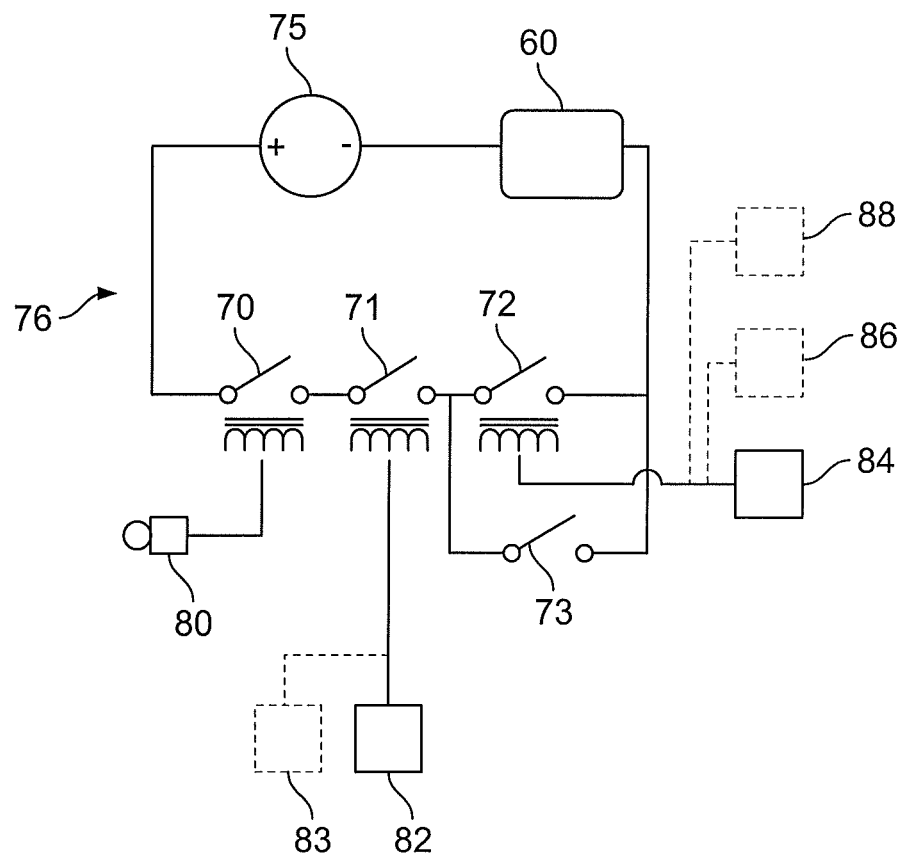
FIG. 4 is a schematic view of an embodiment of a controller for activating the flow inducing device of FIGS. 2 and 3.

FIG. 4 shows one possible embodiment of a controller or control system circuit to activate or deactivate the flow inducing device. A power source, such as a battery 75, supplies a voltage to device 60 via electrical circuit 76. The voltage is controlled by several relays and switches (where the terms "relay" and "switch" are used interchangeably herein), which dictate logical events that must occur simultaneously to in order to supply power to device 60. In order for flow inducing device 60 to operate, the vehicle's ignition switch or key must be turned on to close ignition relay 70, and the system pressure must be below a predetermined threshold to close pressure relay 71. Additionally, it is desirable that the engine is operating, in order for device 60 to operate for two reasons: first, to avoid excessive vehicle battery drain and second, to ensure an adequate amount of heat is supplied to vaporizer 32. A signal indicating that the engine is in operation will close engine operating relay 72. A manual bypass switch 73, connected in parallel with engine operating relay 72, is provided for rare instances when a user may desire to operate the compressor when the engine is not operating (for example, when the tank pressure is too low to even support the engine to start).

A further description of the logical events for the controller or control system circuit are as follows. The signal to close ignition relay 70 can be simply taken from the vehicles ignition switch 80 (FIG. 4). The signal to close pressure relay 71 requires that the pressure in the system is below a predefined limit. Therefore, a pressure switch or sensor should be included in the system of FIG. 2 to sense a system pressure in one of several locations such as the head space 36 of the tank, as illustrated by sensor 82 in FIGS. 2 and 4, or somewhere in pressure building circuit 55, as illustrated by sensor 83 in FIGS. 2 and 4, and can be used to close relay 71 when the sensed pressure is below the pressure threshold or predetermined minimum pressure. A signal to close the engine operating relay 72 may come from a variety of sources that may serve as an engine operating sensor. The most direct source would be a signal from the on vehicle electrical system, 84 in FIG. 4, that senses if the engine is operating or not via the engine's electronic control circuitry. Alternatively, an indirect method of detecting the engine operating may be used by including a temperature switch or sensor in inlet line 51, as illustrated by sensor 86 in FIGS. 2 and 4, or in the heat exchange space surrounding vaporizer 32, as illustrated by sensor 88 in FIGS. 2 and 4, such that relay 72 closes if the temperature is above a predetermined threshold.

It should be appreciated that the controller may take on other forms not limited to the above description. In any case, the primary goals of the control system are 1) to prevent over pressurization of the cryogenic tank; 2) to prevent excessive discharge of the vehicle's battery when the engine is not operating; and 3) to avoid damage to both vaporizer 32 and flow inducing device 52 due to low temperatures when the engine is not operating. In an alternative embodiment, the controller could be omitted completely and the control system could consist of simply a manually controlled "on" and "off" switch or other manual control switch or device.

A typical setup and operation of the described system in accordance with an embodiment of the method of the invention is as follows. The minimum allowable inlet pressure to the engine is 70 psig. To allow an adequate buffer in addition to the largest expected pressure drop from the tank to the engine, one might conclude that the normal operating pressure of the tank should be around 100 psig. Therefore, the economizer regulator is set to open at 100 psig, which will work to lower tank pressure to this level when tank pressure exceeds that value. With an economizer set at 100 psig, it would be logical to have the set point on the flow inducing device around 95 psig. Though technically feasible to have flow inducing device active at 100 psig or higher, it is not best practice because there would then be two active competing devices operating at the same time causing unnecessary energy consumption and wear on the components. In this example, suppose the vehicle fuel tank is filled with LNG saturated at 80 psig. When the engine is restarted after fueling, the compressor will immediately turn on and begin to build a false head pressure in the vapor space. In this example, suppose the compressor moves fluid at a rate of 100 L/min. In about one minute, the pressure may rise to 95 psig at which point the compressor will turn off. However, when the vehicle starts driving and the liquid and gas phases slosh together inside the tank, much of that false vapor head pressure will recondense back to liquid phase, and the tank pressure will drop back to a pressure near its starting pressure. The lower pressure will trigger the compressor to turn on again. While the vehicle is in motion and the liquid and gas phases are in thermodynamic equilibrium, the rate of pressure rise will be much slower, and the saturation of the LNG may increase to 95 psig in several minutes. With fuel saturated at the desired level, the compressor may not need to function again until the tank is again fueled with LNG that is not properly saturated to the required level.

Figure 5:
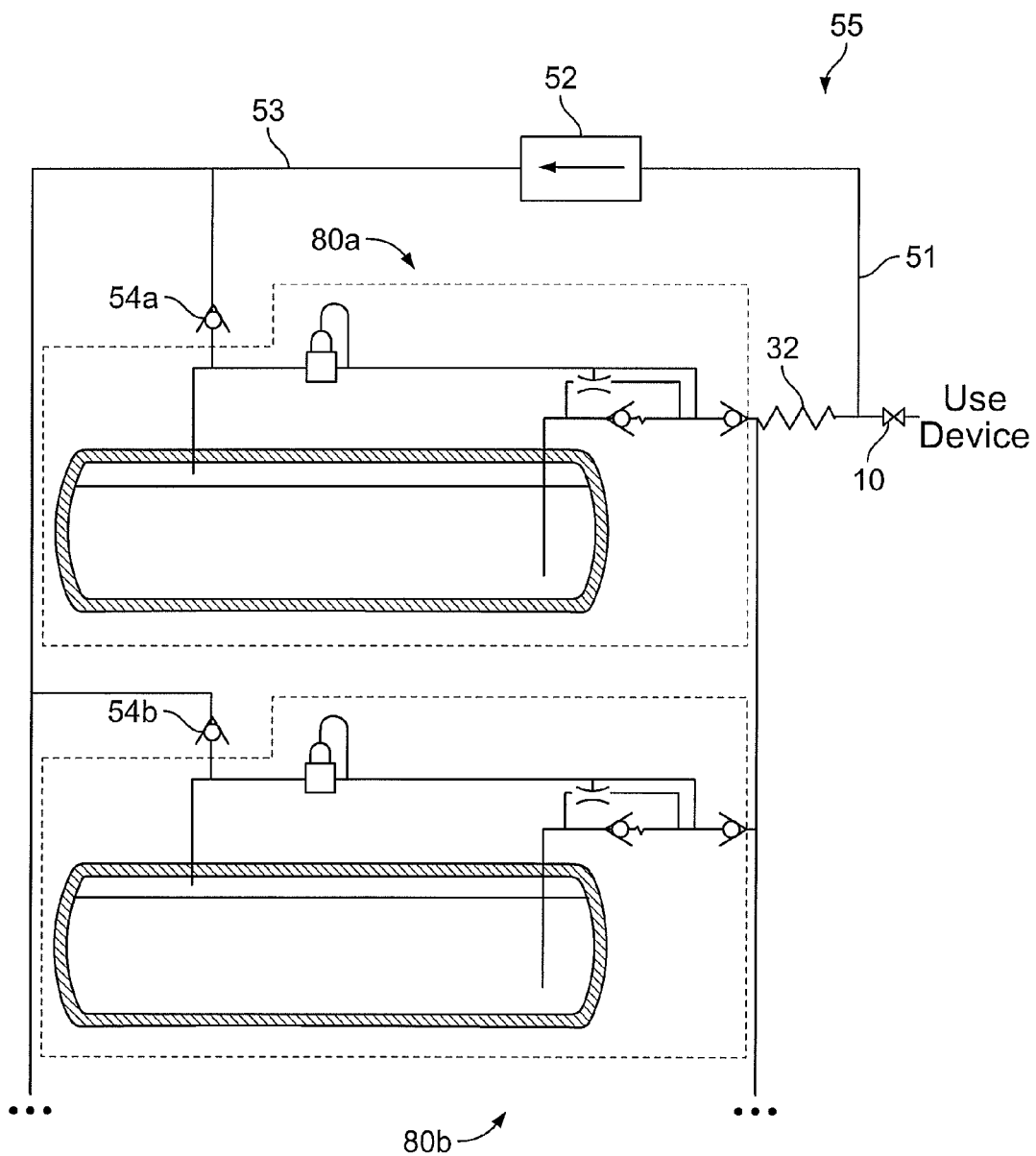
FIG. 5 is a schematic view of a multiple cryogenic tank system in an embodiment of the delivery system of the invention.

In an alternative embodiment of the delivery system of the invention illustrated in FIG. 5, a single pressure building circuit 55 may be used in a system consisting of multiple tanks 80a, 80b, etc. (while two tanks are shown, an alternative number may be used) configured in parallel. As in the embodiment described previously with respect to FIG. 2, inlet line 51 branches off of the withdrawal line downstream of vaporizer 32, and a flow inducer 52 causes vaporized gas to flow from inlet line 51 to outlet line 53. Outlet line 53 returns the gas to the vapor line of the economizer circuit and then to the tank head space via check valves 54a and 54b for tanks 80a and 80b, respectively.

The controller or control system circuit illustrated in FIG. 4 may also be used to activate or deactivate the flow inducing device 52 of FIG. 5. Of course, alternative controllers or control system circuits could be used. Returning to the embodiment of FIGS. 4 and 5, the signal to close pressure relay 71 requires that the pressure in the system is below a predefined limit. Therefore, a pressure switch or sensor should be included in the system of FIG. 5 to sense a system pressure in several locations, such as the bead spaces of the tanks 80*a* and 80*b* or somewhere in pressure building circuit 55, and can be used to close relay 71 of FIG. 4 when the sensed pressure is below the pressure threshold or predetermined minimum pressure. If the pressure in one of the tanks is below the pressure threshold or predetermined minimum pressure (for example, tank 80*a*) and the other pressure of the other tank is not (for example, tank 80*b*), the chock valve corresponding to the tank that is not below the pressure threshold or minimum pressure (check valve 54*b* in the present example) will prevent gas from the pressure building circuit 55 from entering that tank (tank 80*b* in the present example).

While the preferred embodiments of the invention have been shown and described, it will be apparent to those skilled in the art that changes and modifications may be made therein without departing from the spirit of the invention, the scope of which is defined by the appended claims.

What is claimed is:

1. A cryogenic fluid delivery system comprising:
   a tank adapted to contain a supply of cryogenic liquid, said tank including a head space adapted to contain a vapor above cryogenic liquid stored in the tank;
   a liquid withdrawal line adapted to communicate with cryogenic liquid stored in the tank;
   a vapor delivery line;
   a vaporizer having an inlet in communication with the liquid withdrawal line and an outlet in communication with the vapor delivery line;
   a pressure building circuit in communication with the vapor delivery line and the head space of the tank, said pressure building circuit being independent of the liquid withdrawal line, including a flow inducing device including a motor and configured so that vapor produced by the vaporizer is delivered to the head space of the tank when the flow inducing device is activated; and
   a control system in communication with the flow inducing device.

2. The cryogenic fluid delivery system of claim 1 further comprising:
   an economizer circuit in communication with the liquid withdrawal line and the head space of the tank, said economizer circuit adapted to direct vapor from the head space to the liquid withdrawal line when a pressure in the tank rises above a predetermined maximum pressure.

3. The cryogenic fluid delivery system of claim 1 wherein the pressure building circuit includes an inlet line in communication with the vapor delivery line and an inlet of the flow inducing device and an outlet line in communication with an outlet of the flow inducing device and the head space of the tank.

4. The cryogenic fluid delivery system of claim 3 wherein the outlet line includes a check valve which permits vapor to travel through the outlet line to the head space.

5. The cryogenic fluid delivery system of claim 3 wherein the flow inducing device includes a compressor.

6. The cryogenic fluid delivery system of claim 5 wherein the flow inducing device includes a pressure vessel with the compressor positioned within the pressure vessel and wherein the inlet line is in communication with an inlet of the compressor or the pressure vessel and the outlet line is in communication with an outlet of the pressure vessel or the compressor.

7. The cryogenic fluid delivery system of claim 1 further comprising a pressure sensor adapted to detect a pressure of the system and wherein the control system includes a controller having a circuit adapted to communicate with a power source and in communication with the flow inducing device, said circuit including a pressure switch in communication with the pressure sensor, said pressure switch closing when the pressure detected by the pressure sensor drops below a predetermined minimum pressure so that the flow inducing device is activated.

8. The cryogenic fluid delivery system of claim 7 wherein the pressure sensor detects a pressure within the head space of the tank.

9. The cryogenic fluid delivery system of claim 7 wherein the pressure sensor detects a pressure within the pressure building circuit.

10. The cryogenic fluid delivery system of claim 1 further comprising a power source and a pressure sensor adapted to detect a pressure of the system, wherein the control system includes a controller having an electrical circuit in communication with the power source and the flow inducing device, said electrical circuit including a pressure relay in communication with the pressure sensor, said pressure relay closing when the pressure detected by the pressure sensor drops below a predetermined minimum pressure so that said flow inducing device receives power from the power source when the pressure relay is closed.

11. The cryogenic fluid delivery system of claim 10 wherein the power source includes electrical power circuitry of a motorized vehicle.

12. The cryogenic fluid delivery system of claim 11 wherein the electrical circuit is adapted to be placed in an energized condition by ignition circuitry of the vehicle.

13. The cryogenic fluid delivery system of claim 12 further comprising an engine operating sensor adapted to detect when an engine powered by the cryogenic fluid is operating and wherein the electrical circuit includes an engine operating relay in communication with the engine operating sensor, said engine operating relay closing when the engine operating sensor detects that the engine is operating so that said flow inducing device receives power from the power source when the pressure and engine operating relays are closed.

14. The cryogenic fluid deliver system of claim 13 further comprising a bypass switch connected in parallel with said engine operating relay.

15. The cryogenic fluid delivery system of claim 11 wherein the electrical power circuitry of the motorized vehicle includes a battery.

16. The cryogenic fluid delivery system of claim 1 further comprising a power source, a pressure sensor adapted to detect a pressure of the system, and an engine operating sensor adapted to detect when an engine powered by the cryogenic fluid is operating and wherein the control system includes a controller having an electrical circuit in communication with the power source and the flow inducing device, said electrical circuit including a pressure relay in communication with the pressure sensor and an engine operating relay in communication with the engine operating sensor, said pressure relay closing when the pressure detected by the pressure sensor drops below a predetermined minimum pressure and said engine operating relay closing when the engine operating sensor detects that the engine is operating so that said flow inducing device receives power from the power source when the pressure and engine operating relays are closed.

17. The cryogenic fluid delivery system of claim 16 further comprising a bypass switch connected in parallel with said engine operating relay.

18. The cryogenic fluid delivery system of claim 1 further comprising:
   g) a second tank adapted to contain a supply of cryogenic liquid, said second tank including a head space adapted to contain a vapor above cryogenic liquid stored in the second tank;
   h) a second liquid withdrawal line adapted to communicate with cryogenic liquid stored in the second tank;
   i) said second liquid withdrawal line also in communication with the inlet of the vaporizer, and said pressure building circuit also in communication with the head space of the second tank.

19. The cryogenic fluid delivery system of claim 1 wherein the pressure building circuit has an outlet positioned within or adjacent to the head space of the tank.

20. The cryogenic fluid delivery system of claim 1 further comprising a withdrawal valve positioned within the vapor delivery line and wherein the pressure building circuit has an inlet in vapor communication with the vapor delivery line between the withdrawal valve and the outlet of the vaporizer so that vapor produced by the vaporizer may be delivered to the pressure building circuit both when the withdrawal valve is open and closed.

21. A cryogenic fluid delivery system comprising;
   a tank containing a pressurized supply of cryogenic liquid with a vapor space above the cryogenic liquid;
   a liquid withdrawal line in communication with the cryogenic liquid;
   a vapor delivery line;
   a vaporizer having an inlet in communication with the liquid withdrawal line and an outlet in communication with the vapor delivery line;
   a pressure building circuit in communication with the vapor delivery line and the vapor space of the tank, said pressure building circuit being independent of the liquid withdrawal line, including a flow inducing device including a motor and configured so that vapor produced by the vaporizer is delivered to the vapor space of the tank when the flow inducing device is activated; and
   a control system in communication with the flow inducing device.

22. The cryogenic fluid delivery system of claim 21 further comprising:
   an economizer circuit in communication with the liquid withdrawal line and the vapor space of the tank, said economizer circuit adapted to direct vapor from the vapor space to the liquid withdrawal line when a pressure in the tank rises above a predetermined maximum pressure.

23. The cryogenic fluid delivery system of claim 21 wherein the pressure building circuit includes an inlet line in communication with the vapor delivery line and an inlet of the flow inducing device and an outlet line in communication with an outlet of the flow inducing device and the vapor space of the tank.

24. The cryogenic fluid delivery system of claim 23 wherein the outlet line includes a check valve which permits vapor to travel through the outlet line to the vapor space.

25. The cryogenic fluid delivery system of claim 23 wherein the flow inducing device includes a compressor.

26. The cryogenic fluid delivery system of claim 23 wherein the flow inducing device includes a pressure vessel with the compressor positioned therein and wherein the inlet lint is in communication with an inlet of the compressor and the outlet line is in communication with an outlet of the pressure vessel.

27. The cryogetric fluid delivery system of claim 21 further comprising a power source and a pressure sensor adapted to detect a pressure of the system and wherein the control system includes a controller halving a circuit in communication with the power source and the flow inducing device, said circuit including a pressure relay in communication with the pressure sensor, said pressure relay closing when the pressure detected by the pressure sensor drops below a predetermined minimum pressure so that the flow inducing device is activated.

28. The cryogenic fluid delivery system of claim 27 wherein, the pressure sensor detects a pressure within the head space of the tank.

29. The cryogenic fluid delivery system of claim 27 wherein the pressure sensor detects a pressure within the pressure building circuit.

30. The cryogenic fluid delivery system of claim 21 further comprising a power source and a pressure sensor adapted to detect a pressure of the system, wherein the control system includes a controller having an electrical circuit in communication with the power source and the flow inducing device, said electrical circuit including a pressure relay in communication with the pressure sensor, said pressure relay closing when the pressure detected by the pressure sensor drops below a predetermined minimum pressure so that said flow inducing device receives power from the power source when the pressure relay is closed.

31. The cryogenic fluid delivery system of claim 30 wherein the power source includes electrical power circuitry of a motorized vehicle.

32. The cryogenic fluid delivery system of claim 31 wherein the electrical circuit is adapted to be placed in an energized condition by ignition circuitry of the vehicle.

33. The cryogenic fluid delivery system of claim 32 further comprising an engine operating sensor adapted to detect when an engine powered by the cryogenic fluid is operating and wherein the electrical circuit includes an engine operating relay in communication with the engine operating sensor, said engine operating relay closing when the engine operating sensor detects that the engine is operating so that said flow inducing device receives power from the power source when the pressure and engine operating relays are closed.

34. The cryogenic fluid delivery system of claim 33 further comprising a bypass switch connected in parallel with said engine operating relay.

35. The cryogenic fluid delivery system of claim 31 wherein the electrical power circuitry of the motorized vehicle includes a battery.

36. The cryogenic fluid delivery system of claim 21 further comprising a power source, a pressure sensor adapted to detect a pressure of the system, and an engine operating sensor adapted to detect when an engine powered by the cryogenic fluid is operating and wherein the control system includes a controller having an electrical circuit in communication with the power source and the flow inducing device, said electrical circuit including a pressure relay in communication with the pressure sensor and an engine operating relay in communication with the engine operating sensor, said pressure relay closing when the pressure detected by the pressure sensor drops below a predetermined minimum pressure and said engine operating relay closing when the engine operating sensor detects that the engine is operating so that said flow inducing device receives power from the power source when the pressure and engine operating relays are closed.

37. The cryogenic fluid delivery system of claim 36 further comprising a bypass switch connected in parallel with said engine operating relay.

38. The cryogenic fluid delivery system of claim 21 further comprising:
   g) a second tank containing a supply of cryogenic liquid with a vapor space above the cryogenic liquid
   h) a second liquid withdrawal line in communication with the cryogenic liquid stored in the second tank;
   i) said second liquid withdrawal line also in communication with the inlet of the vaporizer, and said pressure building circuit also in communication with the vapor space of the second tank.

39. The cryogenic fluid delivery system of claim 21 wherein the pressure building circuit has an outlet positioned within or adjacent to the vapor space of the tank.

40. The cryogenic fluid delivery system of claim 21 further comprising a withdrawal valve positioned within the vapor delivery line and wherein the pressure building circuit has an inlet in vapor communication with the vapor delivery line between the withdrawal valve and the outlet of the vaporizer so that vapor produced by the vaporizer may be delivered to the pressure building circuit both when the withdrawal valve is open and closed.

* * * * *